(12) United States Patent
Bhargava et al.

(10) Patent No.: US 10,897,167 B2
(45) Date of Patent: Jan. 19, 2021

(54) MULTI-COMPONENT ROTOR FOR AN ELECTRIC MOTOR OF AN APPLIANCE

(71) Applicant: WHIRLPOOL CORPORATION, Benton Harbor, MI (US)

(72) Inventors: Krati Bhargava, St. Joseph, MI (US); James Hull, St. Joseph, MI (US)

(73) Assignee: Whirlpool Corporation, Benton Harbor, MI (US)

(*) Notice: Subject to any disclaimer, the term of this patent is extended or adjusted under 35 U.S.C. 154(b) by 63 days.

(21) Appl. No.: 16/395,600

(22) Filed: Apr. 26, 2019

(65) Prior Publication Data

US 2019/0252932 A1  Aug. 15, 2019

Related U.S. Application Data

(63) Continuation of application No. 14/965,953, filed on Dec. 11, 2015, now Pat. No. 10,326,323.

(51) Int. Cl.
| | |
|---|---|
| *H02K 1/27* | (2006.01) |
| *D06F 37/22* | (2006.01) |
| *H02K 1/30* | (2006.01) |
| *D06F 37/30* | (2020.01) |
| *H02K 7/00* | (2006.01) |
| *H02K 7/08* | (2006.01) |
| *H02K 21/12* | (2006.01) |

(Continued)

(52) U.S. Cl.
CPC ............. *H02K 1/27* (2013.01); *D06F 37/22* (2013.01); *D06F 37/30* (2013.01); *D06F 37/304* (2013.01); *H02K 1/2786* (2013.01); *H02K 1/30* (2013.01); *H02K 7/003* (2013.01); *H02K 7/08* (2013.01); *H02K 21/12* (2013.01); *H02K 21/22* (2013.01); *D06F 37/206* (2013.01)

(58) Field of Classification Search
CPC ........ H02K 1/27; H02K 1/2786; H02K 7/003; H02K 7/08; H02K 21/12; H02K 21/22; D06F 37/30; D06F 37/304; D06F 37/206
See application file for complete search history.

(56) References Cited

U.S. PATENT DOCUMENTS

| | | |
|---|---|---|
| 2,394,075 A | 2/1946 | Kimball |
| 3,194,032 A | 7/1965 | Von Brimer |

(Continued)

FOREIGN PATENT DOCUMENTS

| | | |
|---|---|---|
| CN | 1173063 | 2/1998 |
| CN | 202524190 | 11/2012 |

(Continued)

OTHER PUBLICATIONS

Ishak et al., "Permanent-Magnet Brushless Machines With Unequal Tooth Width and Similar Slot and Pole Numbers," IEEE Transactions on Industry Applications, vol. 41, No. 2, Mar./Apr. 2005.

*Primary Examiner* — Mohamad A Musleh
(74) *Attorney, Agent, or Firm* — Price Heneveld LLP

(57) ABSTRACT

A motor for a laundry appliance includes a drive shaft coupled to a drum at a first end. The rotor frame is coupled proximate the second end of the drive shaft, where the rotor frame includes at least one polymeric material. A central hub includes a core and a perimetrical ring that extends circumferentially around the core. A plurality of recesses are defined within a planar surface of the perimetrical ring, wherein a portion of the polymeric material is received within the plurality of recesses to secure the rotor frame to the central hub.

20 Claims, 6 Drawing Sheets

(51) Int. Cl.
*H02K 21/22* (2006.01)
*D06F 37/20* (2006.01)

(56) References Cited

U.S. PATENT DOCUMENTS

| | | | |
|---|---|---|---|
| 3,223,043 A | 12/1965 | Shapiro | |
| 3,320,451 A | 5/1967 | Wiley | |
| 3,444,402 A | 5/1969 | Cartier | |
| 3,521,100 A | 7/1970 | Tamm | |
| 4,007,386 A | 2/1977 | Rustecki | |
| 4,007,387 A | 2/1977 | Rustecki | |
| 4,187,441 A | 2/1980 | Oney | |
| 4,392,072 A | 7/1983 | Rosenberry | |
| 4,392,073 A | 7/1983 | Rosenberry, Jr. | |
| 4,403,401 A | 9/1983 | Rosenberry | |
| 4,423,345 A | 12/1983 | Nilsson | |
| 4,567,391 A | 1/1986 | Tucker et al. | |
| 4,568,862 A | 2/1986 | Tassinario | |
| 4,623,812 A | 11/1986 | Van de Griend | |
| 4,644,208 A | 2/1987 | Laing | |
| 4,813,126 A | 3/1989 | Williamson | |
| 4,843,269 A | 6/1989 | Shramo | |
| 4,910,861 A | 3/1990 | Dohogne | |
| 4,930,201 A | 6/1990 | Brown | |
| 4,956,139 A | 9/1990 | Koizumi et al. | |
| 4,973,868 A | 11/1990 | Wust | |
| 4,973,872 A | 11/1990 | Dohogne | |
| 4,978,281 A | 12/1990 | Conger, IV | |
| 5,045,742 A | 9/1991 | Armstrong et al. | |
| 5,329,199 A | 7/1994 | Yockey et al. | |
| 5,528,095 A | 6/1996 | Strobl | |
| 5,578,885 A | 11/1996 | Alford et al. | |
| 5,672,405 A | 9/1997 | Plank, Jr. et al. | |
| 5,818,144 A | 10/1998 | Kim | |
| 5,866,964 A | 2/1999 | Li | |
| 5,907,206 A | 5/1999 | Shiga et al. | |
| 6,127,760 A | 10/2000 | Nagasaki et al. | |
| 6,144,131 A | 11/2000 | Hollenbeck et al. | |
| 6,148,647 A | 11/2000 | Kabeya et al. | |
| 6,175,177 B1 | 1/2001 | Sabinski et al. | |
| 6,257,027 B1 | 7/2001 | Imai | |
| 6,285,104 B1 | 9/2001 | Nashiki | |
| 6,370,761 B2 | 4/2002 | Shiga et al. | |
| 6,396,177 B1 | 5/2002 | Shin et al. | |
| 6,445,105 B1 | 9/2002 | Kliman et al. | |
| 6,460,382 B1 | 10/2002 | Kim et al. | |
| 6,477,869 B2 | 11/2002 | Heyder et al. | |
| 6,504,283 B1 | 1/2003 | Asao et al. | |
| 6,510,716 B1 | 1/2003 | Kim et al. | |
| 6,511,232 B1 | 1/2003 | Ishii et al. | |
| 6,564,594 B1 | 5/2003 | Ito et al. | |
| 6,664,703 B2 | 12/2003 | Oketani et al. | |
| 6,729,011 B2 | 5/2004 | Asao et al. | |
| 6,744,157 B2 | 6/2004 | Choi et al. | |
| 6,849,982 B2 | 2/2005 | Haydock et al. | |
| 6,880,229 B2 | 4/2005 | Zepp et al. | |
| 6,892,439 B1 | 5/2005 | Neal et al. | |
| 6,914,363 B2 | 7/2005 | Kim et al. | |
| 6,929,575 B2 | 8/2005 | Takahashi et al. | |
| 6,992,419 B2 | 1/2006 | Kim et al. | |
| 7,015,606 B2 | 3/2006 | Huang et al. | |
| 7,114,355 B2 | 10/2006 | Kim et al. | |
| 7,141,905 B2 | 11/2006 | Vollmer | |
| RE39,416 E | 12/2006 | Shin et al. | |
| 7,196,446 B2 | 3/2007 | Hans | |
| 7,200,917 B2 | 4/2007 | Takano et al. | |
| 7,247,967 B2 | 7/2007 | Ionel et al. | |
| 7,356,906 B2 | 4/2008 | Kim et al. | |
| 7,380,424 B2 | 6/2008 | Kim et al. | |
| 7,397,158 B2 | 7/2008 | Lee et al. | |
| 7,415,849 B2 | 8/2008 | Kim et al. | |
| 7,441,421 B2 | 10/2008 | Kim et al. | |
| 7,443,074 B2 | 10/2008 | Kim et al. | |
| 7,449,137 B2 | 11/2008 | Staargaard et al. | |
| 7,520,148 B2 | 4/2009 | Choi | |
| 7,569,633 B2 | 8/2009 | Koizumi | |
| 7,640,771 B2 | 1/2010 | Fechtel et al. | |
| 7,692,342 B2 | 4/2010 | Ahn | |
| 7,698,803 B2 | 4/2010 | Mitsui et al. | |
| 7,755,228 B2 | 7/2010 | Kim et al. | |
| 7,997,103 B2 | 8/2011 | Kim et al. | |
| 8,011,211 B2 | 9/2011 | Ahn | |
| 8,030,808 B2 | 10/2011 | Zhang | |
| 8,080,907 B2 | 12/2011 | Jeung | |
| 8,179,016 B2 | 5/2012 | Asano | |
| 8,191,389 B2 | 6/2012 | Kim et al. | |
| 8,220,295 B2 | 7/2012 | Choi et al. | |
| 8,344,568 B2 | 1/2013 | Bailey et al. | |
| 8,344,584 B2 | 1/2013 | Ahn et al. | |
| 8,353,216 B2 | 1/2013 | Giordano et al. | |
| 8,358,045 B2 | 1/2013 | Van Heyden et al. | |
| 8,395,293 B2 | 3/2013 | Marchitto | |
| 8,461,739 B2 | 6/2013 | Liang et al. | |
| 8,482,176 B2 | 7/2013 | Bailey et al. | |
| 8,539,665 B2 | 9/2013 | Dokonal et al. | |
| 8,552,601 B2 | 10/2013 | Mizukami et al. | |
| 8,567,043 B2 | 10/2013 | Horst et al. | |
| 8,578,741 B2 | 11/2013 | Gillo et al. | |
| 8,621,896 B2 | 1/2014 | Kim et al. | |
| 8,677,789 B2 | 3/2014 | Gracia Bobed et al. | |
| 8,716,912 B2 | 5/2014 | Bailey et al. | |
| 8,749,111 B2 | 6/2014 | Lee | |
| 8,978,425 B2 | 3/2015 | Lee | |
| 8,987,955 B2 | 3/2015 | Mizukami et al. | |
| 8,997,533 B2 | 4/2015 | Kim et al. | |
| 9,054,571 B2 | 6/2015 | Dokonal et al. | |
| 9,071,090 B2 | 6/2015 | Watanabe et al. | |
| 9,080,279 B2 | 7/2015 | Jun et al. | |
| 9,085,846 B2 | 7/2015 | Garlatti | |
| 9,130,441 B2 | 9/2015 | Okada | |
| 9,206,540 B2 | 12/2015 | Lim et al. | |
| 9,212,445 B2 | 12/2015 | Erickson | |
| 9,312,743 B2 | 4/2016 | Kim et al. | |
| 9,328,447 B2 | 5/2016 | Kim et al. | |
| 9,376,767 B2 | 6/2016 | Quandt et al. | |
| 9,392,925 B2 | 7/2016 | Kim | |
| 9,401,631 B2 | 7/2016 | Wu et al. | |
| 9,472,997 B2 | 10/2016 | Figgins et al. | |
| 9,479,022 B2 | 10/2016 | Hoemann et al. | |
| 9,493,899 B2 | 11/2016 | Lee | |
| 9,545,467 B2 | 1/2017 | Wampler et al. | |
| 9,577,554 B2 | 2/2017 | Kim et al. | |
| 9,644,304 B2 | 5/2017 | Kim et al. | |
| 9,673,678 B2 | 6/2017 | Okada et al. | |
| 9,800,116 B2 | 10/2017 | Iwai et al. | |
| 9,800,117 B2 | 10/2017 | Iwai | |
| 9,896,794 B2 | 2/2018 | Kim | |
| 9,923,493 B2 | 3/2018 | Matsuoka et al. | |
| 9,976,243 B2 | 5/2018 | Kim et al. | |
| 9,988,752 B2 | 6/2018 | Kim et al. | |
| 2003/0214198 A1 | 11/2003 | Harada et al. | |
| 2005/0034491 A1 | 2/2005 | Tazawa et al. | |
| 2005/0073210 A1 | 4/2005 | Rocky et al. | |
| 2006/0042022 A1 | 3/2006 | Kim et al. | |
| 2006/0076845 A1 | 4/2006 | Park et al. | |
| 2006/0119204 A1 | 6/2006 | Awazu et al. | |
| 2007/0068199 A1 | 3/2007 | Dahlmann et al. | |
| 2007/0132323 A1 | 6/2007 | Park | |
| 2007/0138902 A1 | 6/2007 | Ahn et al. | |
| 2007/0138904 A1 | 6/2007 | Chae | |
| 2007/0289341 A1 | 12/2007 | Hollenhorst et al. | |
| 2008/0024019 A1 | 1/2008 | Sakuma et al. | |
| 2009/0085422 A1 | 4/2009 | Kusawake et al. | |
| 2009/0193855 A1 | 8/2009 | Park et al. | |
| 2010/0141079 A1 | 6/2010 | Chu et al. | |
| 2010/0206015 A1 | 8/2010 | Mancini et al. | |
| 2010/0287995 A1 | 11/2010 | Mancini et al. | |
| 2011/0001400 A1 | 1/2011 | Chiba et al. | |
| 2011/0121668 A1 | 5/2011 | Condamin et al. | |
| 2012/0006070 A1 | 1/2012 | Song et al. | |
| 2012/0007481 A1 | 1/2012 | Filippetti et al. | |
| 2012/0043844 A1 | 2/2012 | Bailey et al. | |
| 2013/0009513 A1 | 1/2013 | Jang et al. | |
| 2013/0014545 A1 | 1/2013 | Ushijima et al. | |

(56) References Cited

U.S. PATENT DOCUMENTS

| | | |
|---|---|---|
| 2013/0049512 A1 | 2/2013 | Jung |
| 2013/0055771 A1 | 3/2013 | Tashiro et al. |
| 2013/0106237 A1 | 5/2013 | Jang et al. |
| 2013/0214637 A1 | 8/2013 | Hill et al. |
| 2013/0327098 A1 | 12/2013 | Bae et al. |
| 2014/0084734 A1 | 3/2014 | Ishigami et al. |
| 2014/0125189 A1 | 5/2014 | Hoemann |
| 2014/0139067 A1 | 5/2014 | Neuenschwander et al. |
| 2014/0167531 A1 | 6/2014 | Hangmann |
| 2014/0175912 A1 | 6/2014 | Germann et al. |
| 2014/0232214 A1 | 8/2014 | Bailey et al. |
| 2015/0008769 A1 | 1/2015 | Uchitani et al. |
| 2015/0033802 A1 | 2/2015 | Kleinmanns et al. |
| 2015/0076954 A1 | 3/2015 | Johnson et al. |
| 2015/0076955 A1 | 3/2015 | Hoemann |
| 2015/0207371 A1 | 7/2015 | Duncan et al. |
| 2015/0252507 A1 | 9/2015 | Kim et al. |
| 2015/0256056 A1 | 9/2015 | Kim et al. |
| 2015/0318744 A1 | 11/2015 | Ekin et al. |
| 2015/0368849 A1 | 12/2015 | Pessot et al. |
| 2016/0130739 A1 | 5/2016 | Song |
| 2016/0160961 A1 | 6/2016 | Biro et al. |
| 2016/0197524 A1 | 7/2016 | Bastien |
| 2016/0201246 A1 | 7/2016 | Song et al. |
| 2016/0215436 A1 | 7/2016 | Gasparini |
| 2016/0238011 A1 | 8/2016 | Lambert et al. |
| 2016/0241105 A1 | 8/2016 | Moore et al. |
| 2016/0244905 A1 | 8/2016 | Lv et al. |
| 2016/0245580 A1 | 8/2016 | Brownlow |
| 2016/0348295 A1 | 12/2016 | Bae et al. |
| 2016/0376741 A1 | 12/2016 | Kim et al. |
| 2017/0008403 A1 | 1/2017 | Yazdanpanah et al. |
| 2017/0044705 A1 | 2/2017 | Kim et al. |
| 2017/0122646 A1 | 5/2017 | Kuehl et al. |
| 2017/0179775 A1 | 6/2017 | Kim et al. |
| 2017/0191203 A1 | 7/2017 | Kim et al. |
| 2017/0204551 A1 | 7/2017 | Kim et al. |
| 2017/0268150 A1 | 9/2017 | Lv et al. |
| 2018/0030638 A1 | 2/2018 | Nakagawa et al. |

FOREIGN PATENT DOCUMENTS

| | | |
|---|---|---|
| DE | 9215811 | 2/1993 |
| EP | 1116812 | 7/2001 |
| EP | 1431439 | 6/2004 |
| EP | 2159314 | 3/2010 |
| EP | 3316458 | 5/2018 |
| GB | 2189511 | 10/1987 |
| JP | 59110347 | 6/1984 |
| JP | 23447599 | 2/2001 |
| JP | 2007104795 | 4/2007 |
| WO | 200122560 | 3/2001 |
| WO | 2006001639 | 1/2006 |
| WO | 2006052073 | 5/2006 |
| WO | 2006054842 | 5/2006 |
| WO | 2006064860 | 6/2006 |
| WO | 2007108588 | 9/2007 |
| WO | 2007129352 | 11/2007 |
| WO | 2007132955 | 11/2007 |
| WO | 2009017430 | 2/2009 |
| WO | 2009040302 | 4/2009 |
| WO | 2011141958 | 11/2011 |
| WO | 2014114942 | 7/2014 |

MULTI-COMPONENT ROTOR FOR AN ELECTRIC MOTOR OF AN APPLIANCE

CROSS-REFERENCE TO RELATED APPLICATION

The present application is a continuation of U.S. patent application Ser. No. 14/965,953 filed Dec. 11, 2015, entitled MULTI-COMPONENT ROTOR FOR AN ELECTRIC MOTOR OF AN APPLIANCE, the entire disclosure of which is hereby incorporated herein by reference.

BACKGROUND

The device is in the field of rotors for electric motors. Specifically, the device relates to a rotor hub for a rotor of an electric motor included within a laundry appliance.

SUMMARY

In at least one aspect, a motor for a laundry appliance includes a drive shaft coupled to a drum at a first end. The rotor frame is coupled proximate the second end of the drive shaft, where the rotor frame includes at least one polymeric material. A central hub includes a core and a perimetrical ring that extends circumferentially around the core. A plurality of recesses are defined within a planar surface of the perimetrical ring, wherein a portion of the polymeric material is received within the plurality of recesses to secure the rotor frame to the central hub.

In at least another aspect, a rotor for a motor for driving a laundry appliance includes a rotor frame having at least one polymeric material. A central hub includes a core defining a core outer surface and a perimetrical ring concentrically offset from and outside of the core outer surface. The perimetrical ring includes a ring outer surface and an inner ring surface. The inner ring surface and the core outer surface define an attachment portion, wherein a portion of the at least one polymeric material is received within the attachment portion to secure the polymeric frame to the central hub.

In at least another aspect, a motor for a laundry appliance includes a drive shaft that is coupled to a drum at a first end. A rotor frame is coupled proximate the second end of the drive shaft. The rotor frame includes at least one polymeric material. A central hub includes a core and a perimetrical ring that is offset from an outside of the core. An attachment portion is defined between the perimetrical ring and the outside of the core. A portion of the at least one polymeric material is received within the attachment portion to secure the polymeric frame to the central hub.

These and other features, advantages, and objects of the present device will be further understood and appreciated by those skilled in the art upon studying the following specification, claims, and appended drawings.

DETAILED DESCRIPTION OF EMBODIMENTS

Figure 1:
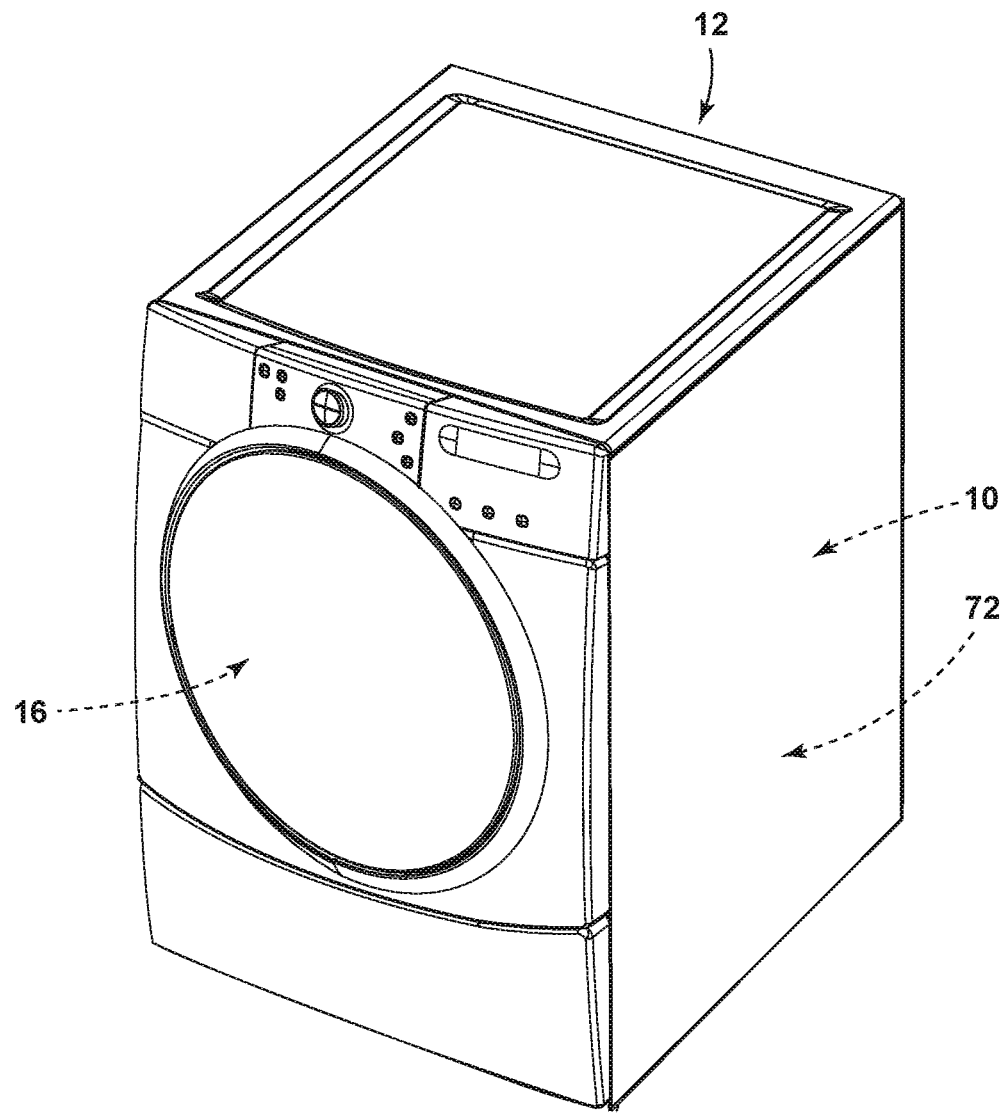
FIG. 1 is a top perspective view of a laundry appliance incorporating a motor that includes an aspect of the dual-ring rotor hub.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As illustrated in FIGS. 1-7, reference numeral 10 generally refers to a motor for an appliance 12, such as a laundry appliance. According to the various embodiments, a motor 10 for the laundry appliance 12, such as a direct drive, includes a drive shaft 14 that is coupled to a drum 16 at a first end 18. A rotor frame 20 is coupled proximate a second end 22 of the drive shaft 14, where the rotor frame 20 includes at least one polymeric material 24. A central hub, in the form of a dual-ring rotor hub 26, is included within the rotor frame 20, where the central dual-ring rotor hub 26 has a core 28 and a perimetrical ring 30 that extends circumferentially around the core 28. A plurality of recesses 32 are defined within a planar surface 34 of the perimetrical ring 30, wherein a portion of the polymeric material 24 is received within the plurality of recesses 32 to secure the rotor frame 20 to the central dual-ring rotor hub 26. It is also contemplated that a plurality of second recesses 36 can be defined within a second planar surface 38 of the perimetrical ring 30, wherein a portion of the polymeric material 24 is also received within the plurality of second recesses 36 to secure the rotor frame 20 to the central dual-ring rotor hub 26.

Referring again to FIGS. 2-7, it is contemplated that the various recesses 32 defined within the planar surface 34 and the second planar surface 38 can define an attachment portion 50 of the central dual-ring rotor hub 26. It is contemplated that this attachment portion 50 of the central dual-ring rotor hub 26 can be set between the inner ring 52 that defines the core 28 and the outer perimetrical ring 30 that extends around the core 28. It is contemplated that the planar surface 34 and the second planar surface 38 of the perimetrical ring 30 can be parallel planes, where the perimetrical ring 30 defines a ring shape having a consistent thickness which extends in a concentric offset manner around the core 28 of the central dual-ring rotor hub 26. According to various alternate embodiments, it is contemplated that the planar surface 34 and the second planar surface 38 can be out of parallel, such that the configuration of the planar surface 34 and the second planar surface 38 contributes to the strength of the connection between the central dual-ring rotor hub 26 and the rotor frame 20.

According to the various embodiments, as exemplified in FIGS. 2-7, it is contemplated that the rotor frame 20 can include an inner polymeric portion 60 that is made of at least one polymeric material 24. In such an embodiment, when the rotor frame 20 is formed, at least a portion of the polymeric material 24 is injected, compressed, or otherwise formed into the recesses 32 and/or the second recesses 36 of the perimetrical ring 30 of the central dual-ring rotor hub 26. In this manner, the forming of the polymeric material 24 within the recesses 32 and the second recesses 36 laterally and rotationally secures the rotor frame 20 to the central dual-ring rotor hub 26. As such, the polymeric material 24 of the inner polymeric portion 60 of the rotor frame 20 flows around the perimetrical ring 30 of the central dual-ring rotor hub 26 and into the recesses 32 and second recesses 36 defined by the attachment portion 50 located between the core 28 and the perimetrical ring 30.

Referring again to FIGS. 1-4, according to an exemplified and non-limiting aspect of the appliance 12, the direct drive motor 10 into which the dual-ring rotor hub 26 is positioned includes a rotor 70 connected to the drive shaft 14 that extends between the rotor 70 and a drum 16 of the appliance 12. The drum 16 is set within a tub 72 that receives wash water for cleaning various articles set within the drum 16. The direct drive motor 10 is attached proximate the tub 72, where a stator 74 of the direct drive motor 10 is coupled to a portion of the tub 72, thereby substantially fixing the location of the stator 74. Disposed in the tub 72 is a bearing housing 76 including at least one bearing 78 that allows the drive shaft 14 to be rotated within the wall 80 of the tub 72. In this manner, as the rotor 70 rotates about the stator 74, the connection of the rotor 70 to the drum 16 via the drive shaft 14 allows for the transfer of torque from the rotor 70 to the drive shaft 14 and, in turn, to the drum 16. Typically, the rotor 70 includes magnets 82 that are in communication with windings 84 of the stator 74 and form a permanent synchronous motor 10. It is contemplated that other types of electric motors 10 can be utilized in conjunction with the dual-ring rotor hub 26, where the motor 10 includes a rotor 70 that rotates relative to a stator 74. It is contemplated that the rotor 70 can rotate within the stator 74, outside the stator 74, or can include a dual-rotor configuration that rotates inside and outside of the stator 74. Such motors 10 in which the dual-ring rotor hub 26 can be used can include, but are not limited to, direct drives, motors 10 that are coupled to transmissions, belt-drive motors 10, and other similar electric motors. Additionally, the various aspects of the dual-ring rotor hub 26 can be used in various orientations of motor 10, including motors 10 that are positioned along a vertical axis, a horizontal axis and/or an angled axis. Additionally, the various motors 10 using the dual-ring rotor hub 26 and the various embodiments of the rotor 70 can have inner rotor, outer rotor or dual rotor configurations.

According to the various embodiments, the various aspects of the rotor 70 described herein can be utilized in various electric motors 10 for use in a variety of appliances 12. These appliances 12 can include front-load washers, top-load washers, dryers, and other similar appliances 12 having a rotational aspect driven by an electric motor 10.

Referring again to FIGS. 2-7, according to the various embodiments, the connection between the dual-ring rotor hub 26 and the rotor frame 20 is configured to be a substantially strong connection to withstand the rotational forces exerted on the connection between the rotor frame 20 and the dual-ring rotor hub 26 as the rotor 70 is rotated about the stator 74 to drive the drum 16 and various loads disposed therein. In order to transfer the loads exerted upon the rotor 70 by the magnetic communication with the stator 74, the rotor frame 20 can be made of various materials that are configured to allow for the transfer of these torque forces from the outer wall 90 of the rotor 70 to the drive shaft 14. In this manner, the rotor frame 20 can include a continuous polymeric material 24 or a plurality of polymeric materials 24, where the rotor frame 20 is formed about the plurality of magnets 82 of the rotor 70 and also about the perimetrical ring 30 of the dual-ring rotor hub 26. It is also contemplated the rotor frame 20 can be made of a variety of materials, where the rotor frame 20 can include the inner polymeric portion 60, an outer polymeric portion 92, and at least one metallic portion, such as a metallic disk 94 that extends between the inner polymeric portion 60 and the outer polymeric portion 92. In such an embodiment, it is contemplated that the inner and outer polymeric portions 60, 92 can be molded around the metallic disk 94 to form the rotor frame 20 into a unitary piece having sufficient strength to transfer the rotational and torque-type forces from the outer wall 90 of the rotor 70 to the drive shaft 14, via the dual-ring rotor hub 26.

According to the various embodiments, the material of the metallic disk 94 can be steel, aluminum, alloys thereof, combinations thereof, and other similar metallic materials. It is contemplated the one or more polymeric materials 24 can include various formable materials that can include, but are not limited to, plastic, resin, polymers, composite-type materials, combinations thereof, and other similar formable materials.

Figure 2:
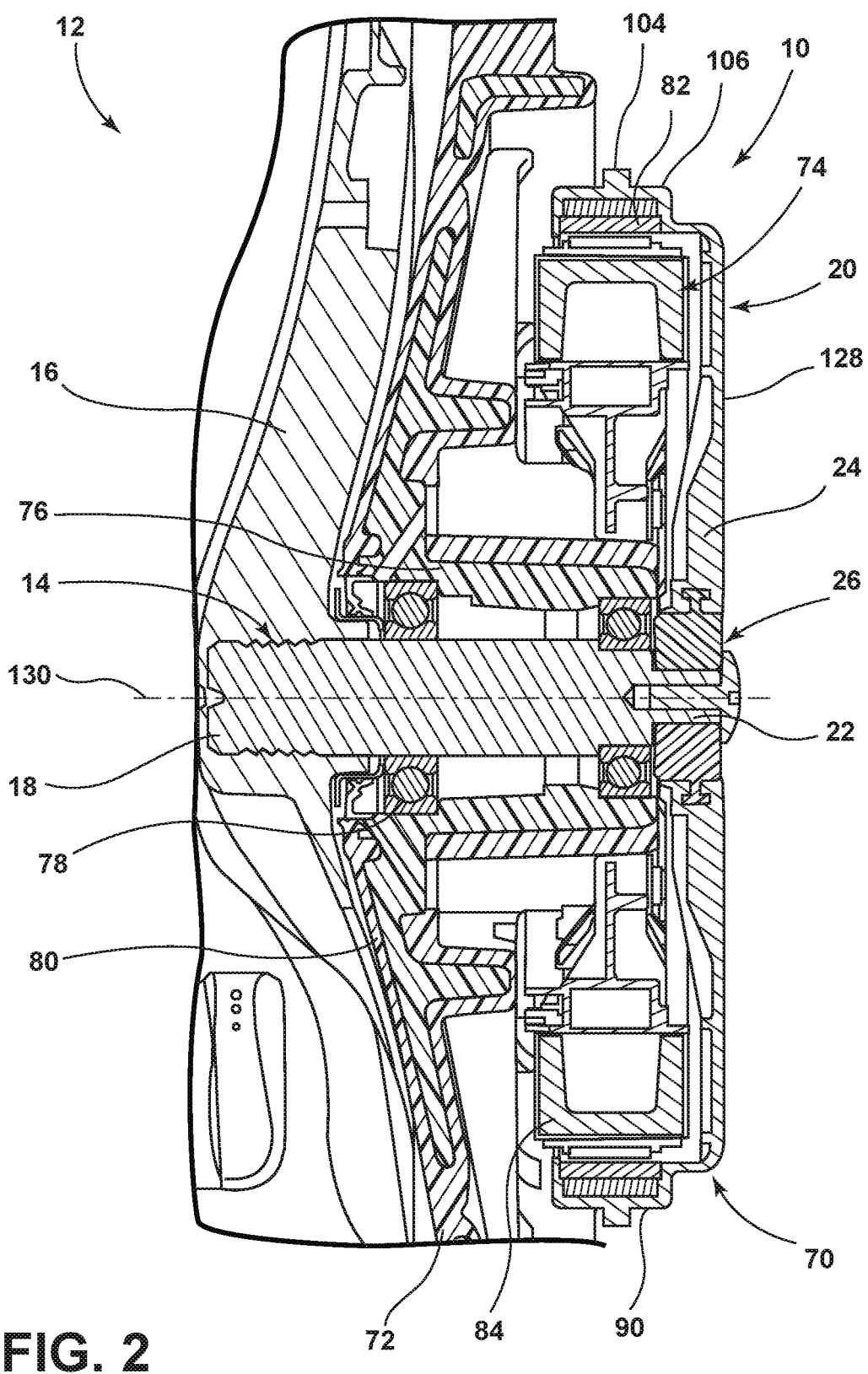
FIG. 2 is a cross-sectional view of a direct drive motor for a laundry appliance having a rotor that incorporates an aspect of the dual-ring rotor hub.
Figure 3:
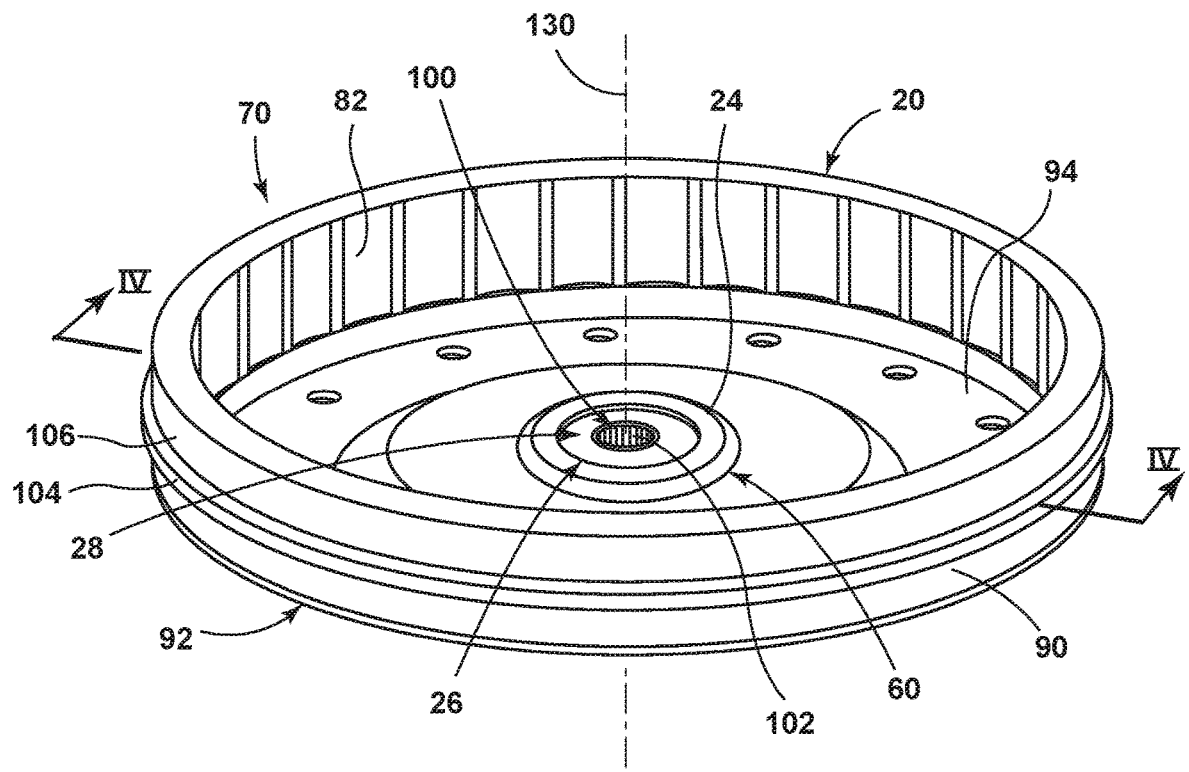
FIG. 3 is a top perspective view of a rotor for a motor incorporating an aspect of the dual-ring rotor hub.
Figure 4:
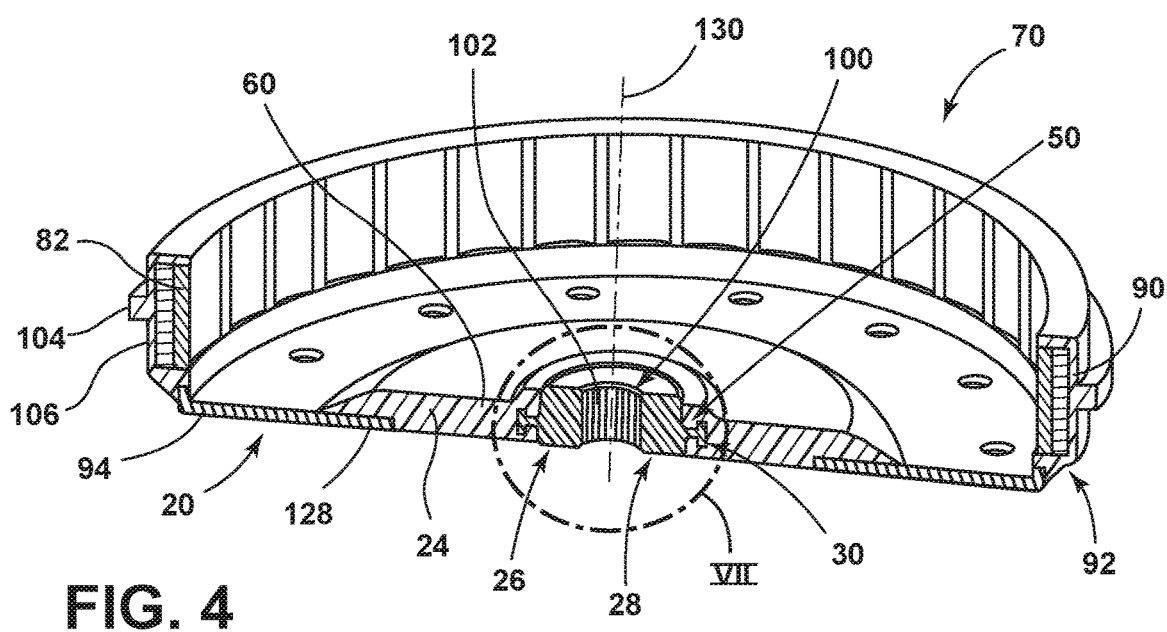
FIG. 4 is a cross-sectional view of the rotor of FIG. 3 taken along line IV-IV.
Figure 5:
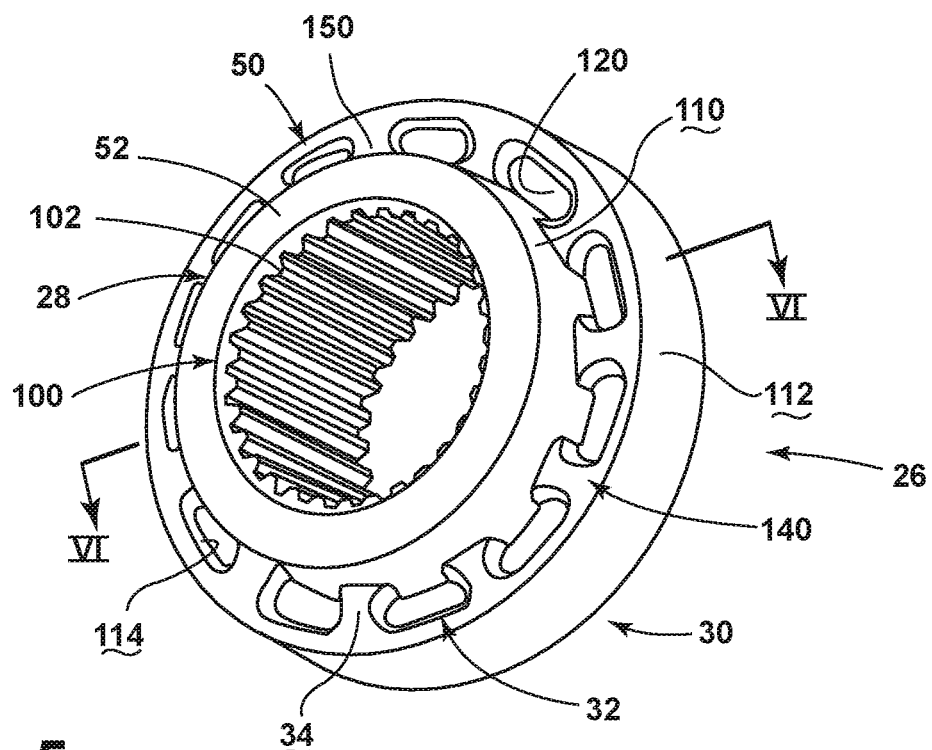
FIG. 5 is a top perspective view of an aspect of the dual-ring rotor hub.
Figure 6:
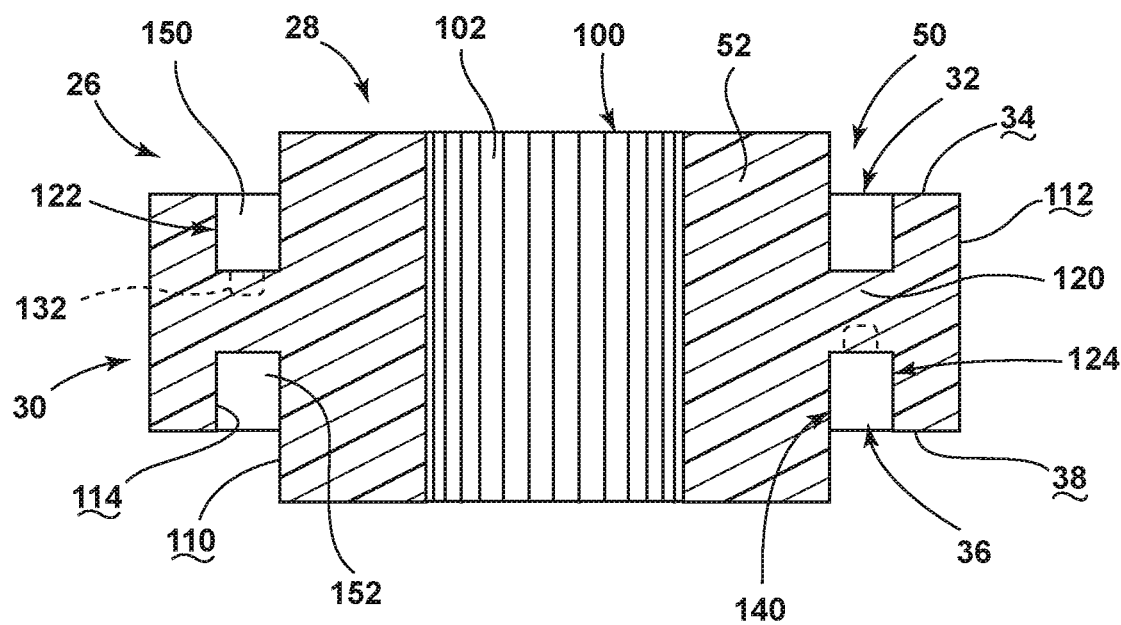
FIG. 6 is a cross-sectional view of the dual-ring rotor hub of FIG. 5, taken along line VI-VI.
Figure 7:
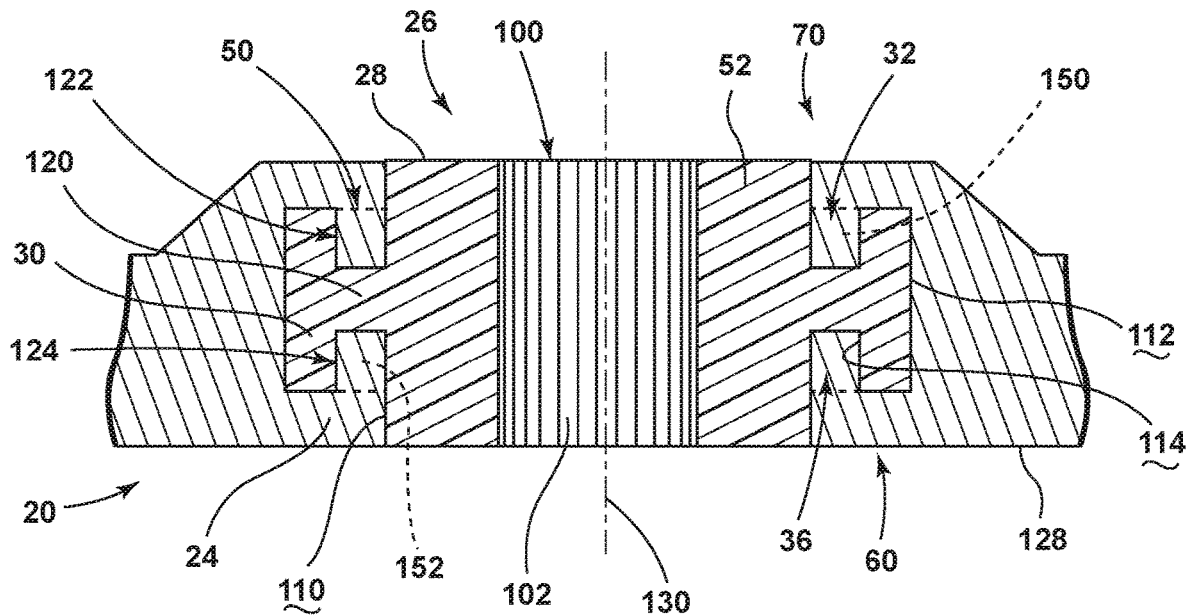
FIG. 7 is an enlarged cross-sectional view of the rotor of FIG. 4 taken at area VII.

According to the various embodiments, as exemplified in FIGS. 2-4, it is contemplated that the inner polymeric portion 60 and the outer polymeric portion 92 can be made of separate polymeric materials. The stresses experienced by the inner polymeric portion 60 proximate the dual-ring rotor hub 26 can be higher than those experienced by the outer polymeric portion 92 where the rotor 70 is in magnetic communication with the stator 74. As such, a highly-rigid polymeric material may be used to form the outer polymeric portion 92. The use of this highly rigid polymeric material can serve to mitigate noise generation during use of the motor 10 of the appliance 12. Such a rigid polymeric material for use in the outer polymeric portion 92 can include, but is not limited to, a bulk molding compound (BMC) and other similar highly rigid polymers. Alternatively, it is contemplated that a different polymer can be used to form the inner polymeric portion 60 that engages the dual-ring rotor hub 26. At this location of the rotor 70, cyclic high stresses can occur in the inner polymeric portion 60 with less sound issues being present. As such, the inner polymeric portion 60 can be made of various plastic materials that can include, but are not limited to, glass-filled polybutylene terephthalate (PBT), polypropylene, nylon, combinations thereof, and other similar high-performance polymers.

Referring again to the various embodiments exemplified in FIGS. 2-4, the outer polymeric portion 92 can also include a stiffening flange 104 that extends around the outer perimeter 106 of the outer polymeric portion 92. The stiffening flange 104 can increase the rigidity of the rotor 70 by stiffening the circular profile of the rotor 70. In this manner, the stiffening flange 104 can serve to counteract various deflections and deformations occurring in the rotor 70 during use.

Referring again to FIGS. 2-7, the dual-ring rotor hub 26 can be made of a metallic material, where such metallic materials can include, but are not limited to, steel, aluminum, aluminum alloy, and other formable metallic materials. In this manner, the dual-ring rotor hub 26 can be formed of a single integral piece through metal forming. While metallic materials are typical for the formation of the central dual-ring rotor hub 26, it is contemplated that various resins and other plastic-type materials can be used for the central dual-ring rotor hub 26.

Referring again to FIGS. 2-7, the recesses 32 and second recesses 36 defined within the attachment portion 50 between the perimetrical ring 30 and the core 28 can include various configurations and alignments. By way of example, and not limitation, it is contemplated that the recesses 32 defined within the planar surface 34 of the perimetrical ring 30 can be configured to be in vertical alignment with the various second recesses 36 defied within the second planar surface 38 of the perimetrical ring 30. Alternatively, the recesses 32 and second recesses 36 can be defined as being free of vertical alignment or out of vertical alignment with one another. The various alignments of the recesses 32 and the second recesses 36 of the attachment portion 50 can be determined based upon the design of the appliance 12, the design of the rotor 70, and the various structural needs of the connection between the rotor frame 20 and the dual-ring rotor hub 26.

Referring again to FIGS. 2-7, it is contemplated that the inner ring 52 defined by the core 28 can include a drive shaft receptacle 100. The drive shaft receptacle 100 of the central dual-ring rotor hub 26 can include a plurality of grooves, or interior teeth 102, that are adapted to engage a plurality of corresponding shaft grooves (not shown) positioned proximate the second end 22 of the drive shaft 14. Accordingly, the torque-type forces exerted upon the rotor 70 at the electromagnetic engagement between the rotor 70 and the stator 74 are transferred through the rotor frame 20 and to the dual-ring rotor hub 26 at the engagement between the rotor frame 20 and the attachment portion 50 of the dual-ring rotor hub 26. These torque-type forces are then transferred to the drive shaft 14 through the engagement of the dual-ring rotor hub 26 at the plurality of interior teeth 102 defined within the drive shaft receptacle 100 and the plurality of shaft grooves at the second end 22 of the drive shaft 14. It is contemplated that the drive shaft 14 can be connected to the drive shaft receptacle 100 through various other connection methods. These connection methods can include, but are not limited to, fasteners, adhesives, welding, interference mechanisms, threads, combinations thereof and other connection methods.

Referring again to FIGS. 2-7, the rotor 70 for the direct drive motor 10 can include the rotor frame 20 having one or more polymeric materials 24. Again, the polymeric material 24 can extend continuously through the rotor frame 20 or can be used in conjunction with various metallic or other dissimilar materials to form a unitary rotor frame 20. Centrally disposed within the rotor frame 20 is the central dual-ring rotor hub 26 that includes the core 28 defining a core outer surface 110 and a perimetrical ring 30 concentrically offset from and outside the core outer surface 110. The perimetrical ring 30 includes an outer ring surface 112 and an inner ring surface 114. It is contemplated that the space between the inner ring surface 114 and the core outer surface 110 define an attachment portion 50. At least a part of the at least one polymeric material 24 can be received within the attachment portion 50 to secure the rotor frame 20 to the central dual-ring rotor hub 26.

Referring again to FIGS. 4-7, it is contemplated the attachment portion 50 of the dual-ring rotor hub 26 can include a circumferential wall 120 that extends between the core outer surface 110 and the inner ring surface 114. The circumferential wall 120 substantially divides the attachment portion 50 into opposing first and second channels 122, 124. The circumferential wall 120 disposed through the attachment portion 50 can be oriented to be substantially parallel with a base 128 of the rotor frame 20 and substantially perpendicular to an axis of rotation 130 of the drive shaft 14. In this manner, the first and second channels 122, 124 of the attachment portion 50, being separated by the circumferential wall 120, are each configured to receive at least a portion of the polymeric material 24 of the rotor frame 20. In order to further the engagement between the polymeric material 24 of the rotor frame 20 and the attachment portion 50 of the dual-ring rotor hub 26, the circumferential wall 120 can include various perforations 132 that extend at least partially into the circumferential wall 120.

According to various embodiments, it is also contemplated that these perforations 132 can extend through the circumferential wall 120, such that the first and second channels 122, 124 of the attachment portion 50 are at least partially in communication with one another through the circumferential wall 120. In such an embodiment, as the polymeric material 24 is formed into the first and second channels 122, 124, the polymeric material 24 can extend from the first channel 122 and into at least a portion of the second channel 124, and vice versa. It is also contemplated that the circumferential wall 120 can be free of, or substantially free of, perforations 132, such that the first and second channels 122, 124 of the attachment portion 50 are fully divided by the circumferential wall 120 extending between the core outer surface 110 and the inner ring surface 114.

Referring again to FIGS. 3-7, in addition to the circumferential wall 120, it is contemplated that the attachment portion 50 can include a plurality of radial walls 140 that extend from at least one of the core outer surface 110 and the inner ring surface 114. In this manner, the plurality of radial walls 140 are configured to divide the first channel 122 into the plurality of recesses 32. It is also contemplated that the plurality of radial walls 140 can divide the second channel 124 into the plurality of second recesses 36. According to the various embodiments, the plurality of radial walls 140 are configured to extend radially outward from the axis of rotation 130 of the drive shaft 14. It is also contemplated that the radial walls 140 can include some other geometrical orientation, where such orientations can include, but are not limited to, grid-type configurations, irregular configurations, concentric configurations, combinations thereof, and other similar geometric configurations.

According to the various embodiments, the plurality of radial walls 140 can extend fully between the inner ring surface 114 and the core outer surface 110. In such an embodiment, the recesses 32 and second recesses 36 disposed within the attachment portion 50 are fully separated and each of the recesses 32 and each of the second recesses 36 individually receives portions of the polymeric material 24 when the rotor frame 20 is being formed. It is also contemplated that the plurality of radial walls 140 can extend only partially between the inner ring surface 114 and the core outer surface 110 (exemplified in FIG. 8). In such an embodiment, the various recesses 32 and second recesses 36 can be at least partially in communication with one another, respectively.

Referring again to FIGS. 3-7, it is contemplated that the attachment portion 50 defined between the perimetrical ring 30 and the core 28 can be substantially free of the circumferential wall 120 described above. In such an embodiment, the attachment portion 50 can include the plurality of radial walls 140 that extend between the core outer surface 110 and the inner ring surface 114. In such an embodiment, the plurality of radial walls 140 serve to divide the attachment portion 50 into a plurality of attachment cavities that are defined by the recesses 32 and second recesses 36 when the circumferential wall 120 is omitted. The plurality of attachment cavities each receive a portion of the polymeric material 24 to define the engagement between the rotor frame 20 and the dual-ring rotor hub 26.

According to the various embodiments, it is contemplated that the plurality of radial walls 140 can include a plurality of first radial walls 150 that are disposed in the first channel 122 and a plurality of second radial walls 152 that are disposed in the second channel 124. In such an embodiment, it is contemplated that the plurality of first radial walls 150 can be free of alignment with the plurality of second radial walls 152. In embodiments having the circumferential wall 120, this configuration results in the recesses 32 being free of alignment with the second recesses 36. In the various embodiments being free of the circumferential wall 120, the lack of vertical alignment between the first radial walls 150 and the second radial walls 152 can define a series of alternating attachment cavities defined between the first and second radial walls 150, 152 positioned within the attachment portion 50 between the perimetrical ring 30 and the core 28.

The attachment portion 50 defined between the perimetrical ring 30 and the core 28 can include various configurations of the radial walls 140, circumferential wall 120, recesses 32, and second recesses 36 that are configured to maintain the structural integrity of the engagement between the rotor frame 20 and the dual-ring rotor hub 26. The exact configurations of the various features defined between the perimetrical ring 30 and the core 28 can vary in order to secure the polymeric material 24 within the attachment portion 50 of the dual-ring rotor hub 26.

Referring again to FIGS. 2-7, the direct drive motor 10 can include the drive shaft 14 that is coupled to the drum 16 at the first end 18. The rotor frame 20 is coupled proximate the second end 22 of the drive shaft 14, where the rotor frame 20 includes at least one polymeric material 24 that is configured to engage the central dual-ring rotor hub 26. The central dual-ring rotor hub 26 includes the core 28 and the perimetrical ring 30 that is offset from and outside of the core 28. The attachment portion 50 is defined between the core 28 and the perimetrical ring 30. In this manner, a portion of at least one polymeric material 24 is received within the attachment portion 50 to secure the rotor frame 20 to the central dual-ring rotor hub 26.

According to the various embodiments, the various radial walls 140 and/or circumferential walls 120 can be included within the attachment portion 50 to define the recesses 32, second recesses 36, attachment cavities, and other securing features to allow the polymeric material 24 to be formed within the attachment portion 50, such that the primary attachment between the rotor frame 20 and the dual-ring rotor hub 26 occurs within the attachment portion 50. Accordingly, the outer ring surface 112 of the perimetrical ring 30 can be substantially smooth and free of the various protrusions, teeth, or other outwardly extending securing features. The lack of these features can provide for an easier system of forming the various structures of the dual-ring rotor hub 26. Similarly, the core outer surface 110 of the core 28 above and below the perimetrical ring 30 can also be made to be free of protrusions, teeth, and other outwardly extending features. Accordingly, the engagement between the rotor frame 20 and the dual-ring rotor hub 26 is primarily defined between the perimetrical ring 30 and the core 28. In this manner, the various physical features disposed within the attachment portion 50 of the dual-ring rotor hub 26 allow for a secure engagement between the polymeric material 24 and the various physical features of the attachment portion 50 of the dual-ring rotor hub 26.

According to the various embodiments, it is typical that the outer ring surface 112 of the perimetrical ring 30 and the core outer surface 110 of the core 28 above and below the perimetrical ring 30 will be a substantially smooth and cylindrical surface that is free or substantially free of protrusions, teeth, and other outwardly extending features. It is contemplated, though not typical, that the outer surface of the perimetrical ring 30 and the outward-facing surface of the core 28, above and below the perimetrical ring 30, can include various protrusions and other outwardly extending features to further define the engagement between the rotor frame 20 and the dual-ring rotor hub 26.

Figure 8:
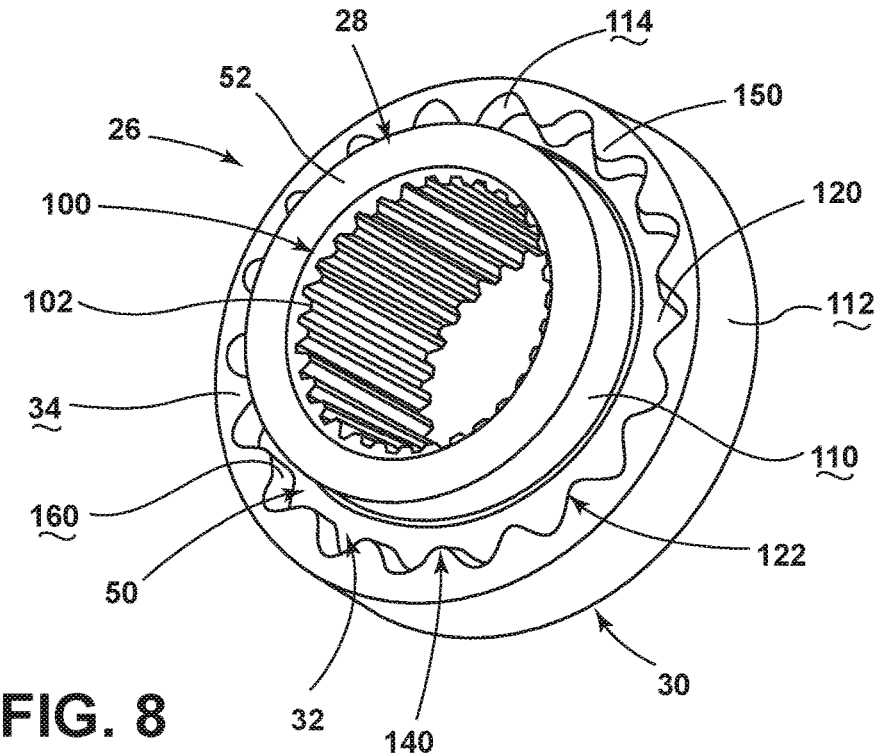
FIG. 8 is a top perspective view of another aspect of a dual-ring rotor hub.

Referring now to the various embodiments of the device as exemplified in FIG. 8, it is contemplated that the attachment portion 50 of a dual-ring rotor hub 26 can include various undulating surfaces 160 that define a substantially continuous recess 32 that extends circumferentially between the core 28 and the perimetrical ring 30. These undulating surfaces 160 can extend from the outer core surface 110, the inner ring surface 114, or a combination of both. As discussed above, the undulating surfaces 160 defined between the perimetrical ring 30 and the core 28 can include various radial walls 140 that extend partially between the perimetrical ring 30 and the core 28 to define the undulating surface 160 and resulting recess 32 defined within the attachment portion 50 of the dual-ring rotor hub 26.

Figure 9:
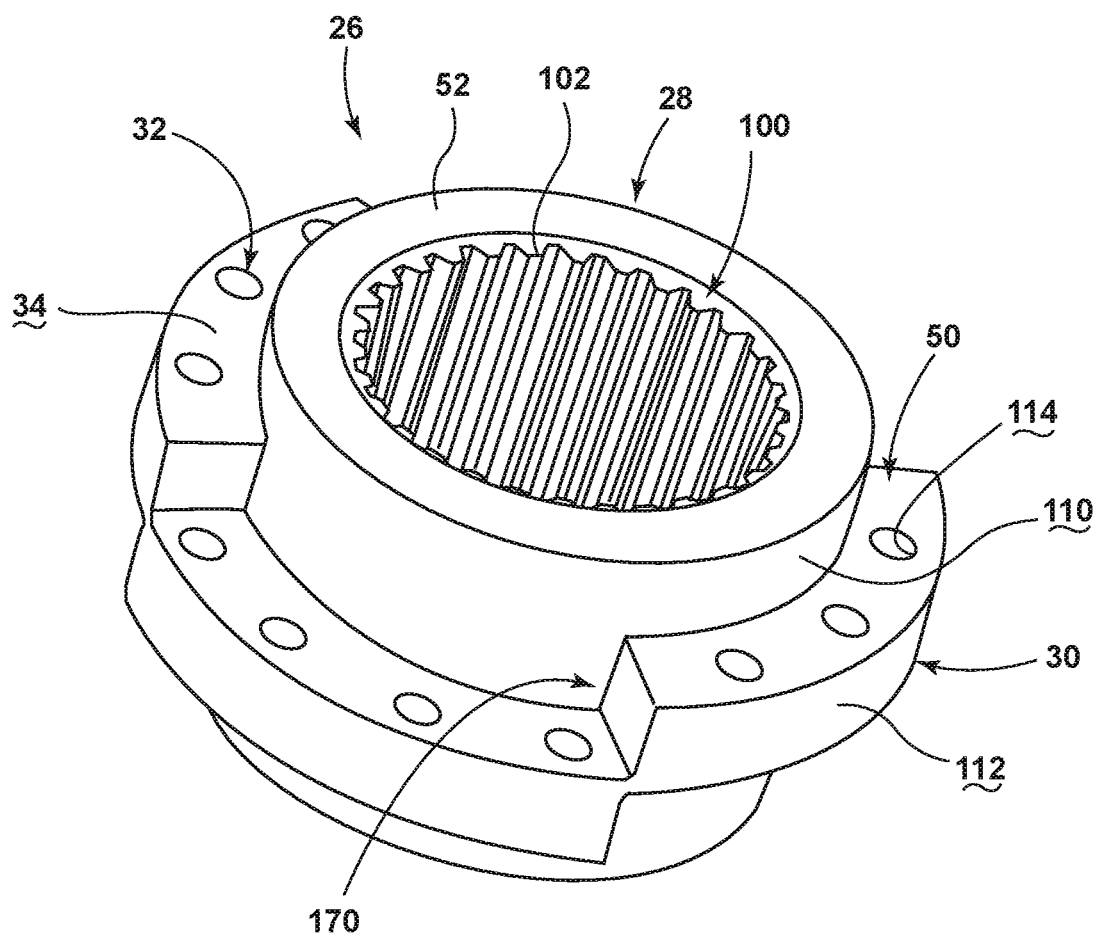
FIG. 9 is a top perspective view of another aspect of a dual-ring rotor hub.

Referring now to various aspects of the device as is exemplified in FIG. 9, it is contemplated that the perimetrical ring 30 can be defined by a discontinuous member that includes vertically undulating portions 170. In such an embodiment, the recesses 32 defined within a first surface of the perimetrical ring 30 can be further defined by the vertically undulating portions 170 of the perimetrical ring 30. Accordingly, the vertically undulating portions 170 of the perimetrical ring 30 corresponds to a plurality of vertically undulating recesses 32 and second recesses 36 defined within the first and second surfaces of the perimetrical ring 30. In such an embodiment, it is contemplated that the vertically undulating portions 170 and the perimetrical ring 30 can further define the attachment portion 50 of the dual-ring rotor hub 26. In the vertically undulating configurations of the perimetrical ring 30, these vertically undulating portions 170 can be defined by curvilinear undulations, rectilinear undulations, offset portions of the perimetrical ring 30, and other generally sinusoidal geometrical undulations that occur circumferentially about the core 28 of the dual-ring rotor hub 26.

According to the various embodiments, the primary engagement between the rotor frame 20 and the dual-ring rotor hub 26 occurs within the attachment portion 50 defined between the perimetrical ring 30 and the core outer surface 110. In this manner, the polymeric material 24 of the rotor frame 20 is configured to conform around the perimetrical ring 30 and into the attachment portion 50. In this manner, resistance to the various rotational and axial forces exerted between the rotor 70, the stator 74, and the drive shaft 14 are received within the attachment portion 50 and the perimetrical ring 30 and transferred through the attachment portion 50 to the core 28 and into the drive shaft receptacle 100 and to the drive shaft 14 for transferring the torque from the drive shaft 14 to the drum 16. By locating the attachment portion 50 outward from the core 28, the engagement between the rotor frame 20 and the dual-ring rotor hub 26 is positioned further outward from the axis of rotation 130 of the drive shaft 14 than other conventional rotor hubs. The use of the perimetrical ring 30 to extend the dual-ring rotor hub 26 in an outward direction within the rotor frame 20 serves to provide a more efficient transfer of torque from the rotor frame 20, through the dual-ring rotor hub 26, and into the drive shaft 14 for transferring torque from the drive shaft 14 to the drum 16 of the appliance 12.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A motor for a laundry appliance, the motor comprising:
a drive shaft coupled proximate a drum at a first end;
a rotor frame coupled proximate a second end of the drive shaft, the rotor frame including at least one polymeric material; and
a central hub comprising:
an outer perimetrical ring that defines a cylindrical outer surface;
a plurality of recesses positioned within an inner surface of the outer perimetrical ring; and
a core that receives the drive shaft, wherein the core is positioned between the plurality of recesses and the drive shaft, wherein the at least one polymeric material is received within the plurality of recesses defined between an outer surface of the core and the inner surface of the outer perimetrical ring to secure the rotor frame to the central hub.

2. The motor of claim 1, wherein the plurality of recesses are defined by a plurality of radial walls that extend between an outer surface of the core and an inner surface of the outer perimetrical ring, wherein the plurality of recesses each receive at least a portion of the at least one polymeric material.

3. The motor of claim 2, wherein the plurality of recesses are defined within a planar surface of the outer perimetrical ring and a plurality of second recesses are defined within a second planar surface of the outer perimetrical ring, and wherein a portion of the at least one polymeric material is also received within the plurality of second recesses to secure the rotor frame to the central hub.

4. The motor of claim 3, wherein the planar surface and the second planar surface are parallel.

5. The motor of claim 1, wherein the central hub is metallic.

6. The motor of claim 3, wherein the plurality of recesses are in vertical alignment with the plurality of second recesses.

7. The motor of claim 1, wherein the rotor frame is formed of a continuous polymeric material.

8. The motor of claim 1, wherein the rotor frame includes a metallic portion that is coupled to the at least one polymeric material.

9. A rotor for a motor for driving a laundry appliance, the rotor comprising:
a rotor frame including at least one polymeric material;
a central hub comprising:
a core defining a core outer surface;
an attachment portion that is defined by the core outer surface;
an outer perimetrical ring positioned outside of the core and having an inner surface that further defines the attachment portion, wherein the at least one polymeric material is received within the attachment portion defined between the core outer surface and the inner surface of the outer perimetrical ring to secure the rotor frame to the central hub.

10. The rotor of claim 9, wherein the attachment portion includes a plurality of radial walls that extend between the core outer surface and the inner surface of the outer perimetrical ring.

11. The rotor of claim 10, wherein the plurality of radial walls divides the attachment portion into a plurality of attachment cavities, wherein the plurality of attachment cavities each receive at least a portion of the at least one polymeric material.

12. The rotor of claim 9, wherein the attachment portion includes a circumferential wall extending between the core outer surface and the inner surface, wherein the circumferential wall divides the attachment portion into opposing first and second channels.

13. The rotor of claim 12, wherein the circumferential wall is free of perforations.

14. The rotor of claim 12, wherein the attachment portion includes a plurality of radial walls that extend from at least one of the core outer surface and the inner surface, wherein the plurality of radial walls divide the first channel into a plurality of recesses, and wherein the plurality of radial walls divides the second channel into a plurality of second recesses.

15. The rotor of claim 14, wherein the plurality of radial walls includes a plurality of first radial walls disposed within the first channel and a plurality of second radial walls disposed within the second channel, and wherein the plurality of first radial walls are free of alignment with the plurality of second radial walls.

16. A motor for a laundry appliance, the motor comprising:
a drive shaft coupled proximate a drum at a first end;
a rotor frame coupled proximate a second end of the drive shaft, the rotor frame including at least one polymeric material; and
a central hub comprising:
a core that receives the second end of the drive shaft;
an attachment portion extending concentrically around an outer surface of the core;
an outer perimetrical ring positioned concentrically outside of the core, wherein an inner surface of the outer perimetrical ring further defines the attachment portion, wherein a portion of the at least one polymeric material is received within the attachment portion to secure the rotor frame to the central hub.

17. The motor of claim 16, wherein the attachment portion includes a circumferential wall extending between a core outer surface and an inner surface, wherein the circumferential wall divides the attachment portion into opposing first and second channels.

18. The motor of claim 16, wherein the attachment portion includes a plurality of radial walls that extend from the outer surface of the core to the inner surface of the outer perimetrical ring.

19. The motor of claim 16, wherein the rotor frame includes an inner polymeric portion that is attached to the central hub and an outer polymeric portion disposed proximate a plurality of magnets attached to an outer wall, and wherein a metallic disk extends between the inner and outer polymeric portions, the inner and outer polymeric portions being formed at least partially around the metallic disk.

20. The motor of claim 17, wherein the circumferential wall is free of perforations.

* * * * *